US006310326B1

(12) United States Patent
Wang

(10) Patent No.: US 6,310,326 B1
(45) Date of Patent: Oct. 30, 2001

(54) OVEN WITH A WATER INJECTION MECHANISM

(76) Inventor: Donglei Wang, No. 4 Factory, Industrial District, Pinglanyuan, Nanping County, Zuhai City, 519060 (CN)

( * ) Notice: Subject to any disclaimer, the term of this patent is extended or adjusted under 35 U.S.C. 154(b) by 0 days.

(21) Appl. No.: 09/656,835

(22) Filed: Sep. 7, 2000

(30) Foreign Application Priority Data

Sep. 15, 1999 (CN) .............................. 99238753 U

(51) Int. Cl.[7] .............................. A21B 1/36; A47J 37/06; A47J 27/04
(52) U.S. Cl. .................... 219/401; 219/386; 219/524; 99/372; 126/20
(58) Field of Search .................................. 219/385, 386, 219/401, 524; 99/345, 372; 126/20

(56) References Cited

U.S. PATENT DOCUMENTS

| 1,380,656 | * | 6/1921 | Lauth | 99/345 |
| 2,181,434 | * | 11/1939 | Lewis et al. | 126/20 |
| 3,596,590 | * | 8/1971 | Harris | 99/372 |
| 3,744,400 | * | 7/1973 | Woodruff | 99/345 |
| 4,075,939 | * | 2/1978 | Horn et al. | 99/345 |
| 4,250,959 | * | 2/1981 | Spasojevic | 99/357 |
| 4,495,932 | * | 1/1985 | Bratton | 126/20 |
| 5,363,748 | * | 11/1994 | Boehm et al. | 99/372 |
| 5,606,905 | * | 3/1997 | Boehm et al. | 99/375 |
| 5,615,604 | * | 4/1997 | Chenglin | 219/386 |

FOREIGN PATENT DOCUMENTS

587040 * 4/1977 (CH) .
4223451 * 1/1994 (DE) .

* cited by examiner

Primary Examiner—Joseph Pelham
(74) Attorney, Agent, or Firm—McDermott, Will & Emery

(57) ABSTRACT

The invention is to provide an oven comprising an oven body which includes a base and a top cover pivotally connected with the base; a chamber, comprising an upper board fixed on the top cover and a lower board fixed on the base; and a water injection mechanism positioned between the top cover and the upper board. By continuously supplying water to the chamber, the oven can effectively prevent the food from over-dehydration and guarantee the freshness of the roasted food.

7 Claims, 2 Drawing Sheets

OVEN WITH A WATER INJECTION MECHANISM

FIELD OF THE INVENTION

The present invention relates to a food processing apparatus, and more specifically to an oven with a water injection mechanism.

BACKGROUND ON THE INVENTION

At present, there are a variety of ovens on the market. The traditional double-sided ovens are used for roasting food rapidly, but the food roasted in such ovens is likely to be over-dehydrated and even burned due to the loss of water in the food through evaporation.

SUMMARY OF THE INVENTION

In order to solve this problem, the present invention provides a new type of oven which not only saves time and electricity but also guarantees the freshness of the roasted food by keeping the water therein.

The oven according to the invention comprises an oven body comprising a base and a top cover pivotally connected with the base; a chamber comprising an upper board fixed on the top cover and a lower board fixed on the base; and a water injection mechanism positioned between the top cover and the upper board.

Said water injection mechanism comprises a water container with a dripping hole on the bottom facing a water-injecting hole in the upper board. The water in the container is injected into the chamber through the dripping hole and the injecting hole.

By continuously supplying water to the chamber, the novel oven according to the present invention can effectively prevent the food from over-dehydration and guarantee the freshness of the roasted food.

DETAILED DESCRIPTION OF THE INVENTION

Figure 1:
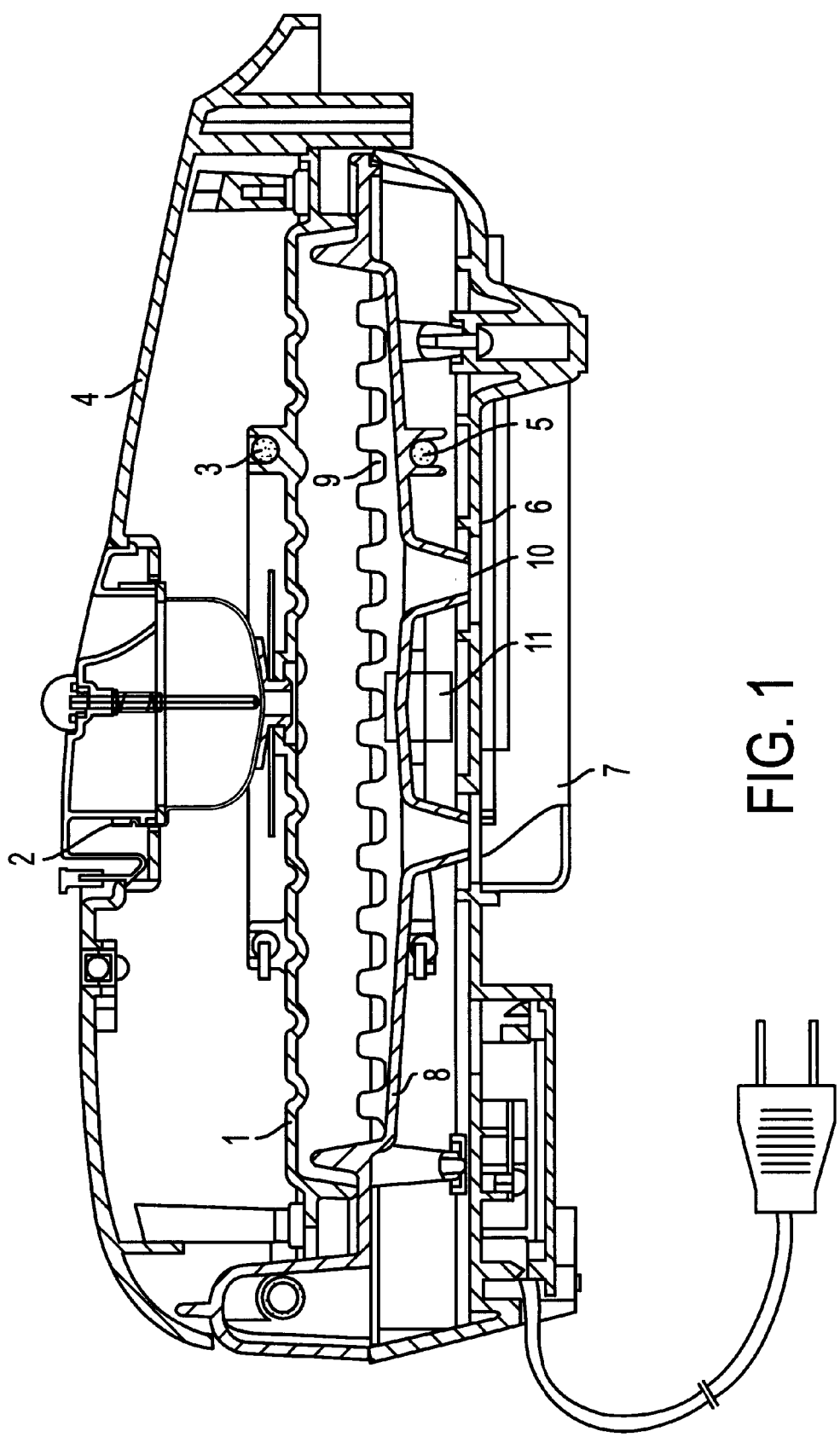
FIG. 1 is a structural view showing the oven with a water injection mechanism according to the present invention.

The above features and advantages of the invention are now described in detail with reference to the accompany drawings. Similar reference numerals indicate the identical elements.

FIG. 1 is a structural view showing one preferred embodiment with a water injection mechanism according to the present invention. Referring to FIG. 1, the oven comprises an oven body which includes a base 6 and a top cover 4 pivotally connected therewith; a chamber, comprising an upper board 1 fixed on the top cover 4 and a lower board 8 fixed on the base 6; and a water injection mechanism positioned between the top cover 4 and the upper board 1. Moreover, electric-heating pipes 3 and 5 are mounted on the reverse sides of the boards 1 and 8 respectively.

Figure 2:
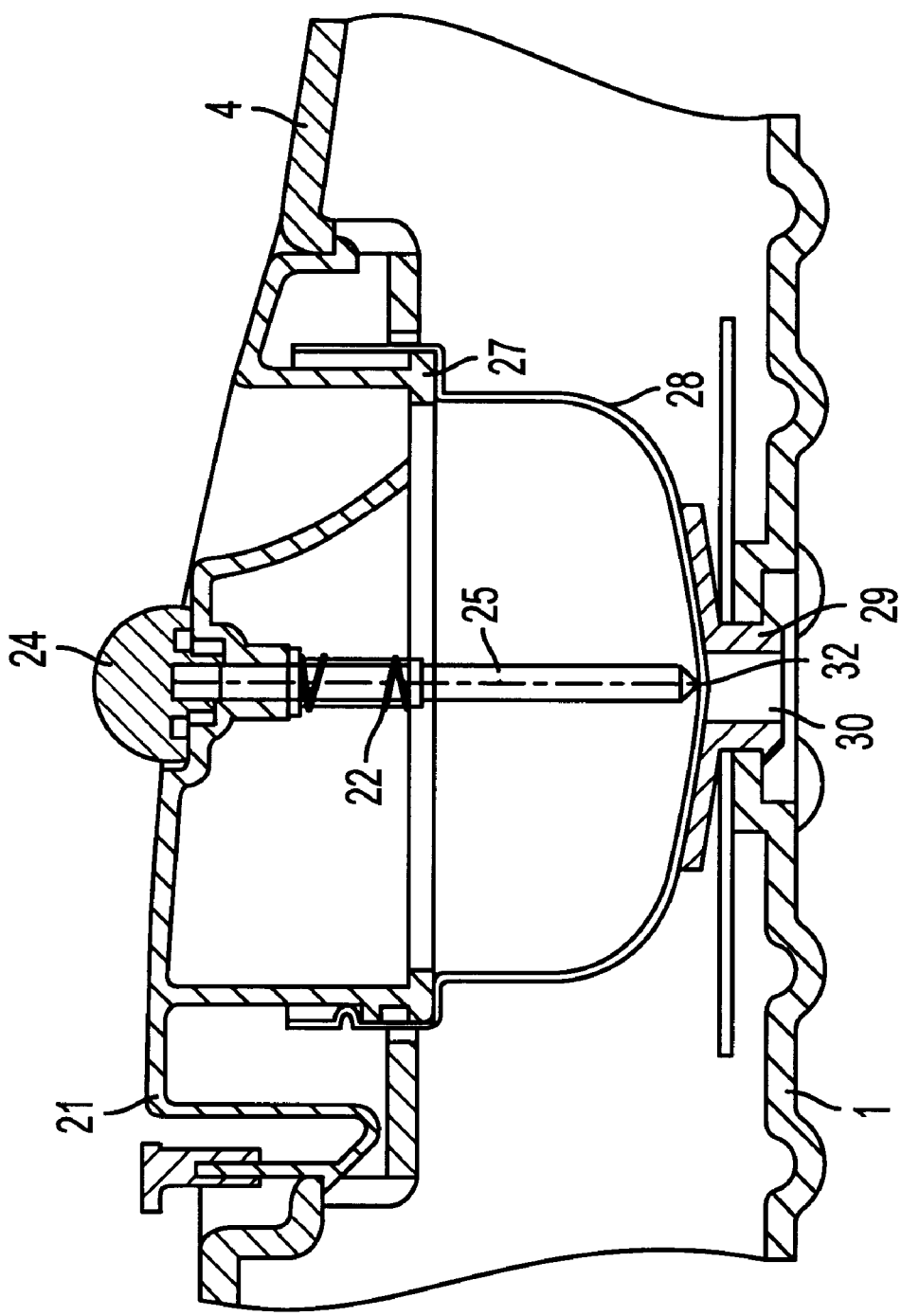
FIG. 2 is a sectional enlargement view of the water injection mechanism according to one preferred embodiment of the invention.

FIG. 2 is an enlarged sectional view of the water injection mechanism according to one preferred embodiment of the invention. As shown in FIG. 2, the water injection mechanism comprises a water container 2 with a dripping hole 32 on the bottom facing a water-injecting hole 30 in the upper board 1. The water in the container 2 is injected into the chamber through the dripping hole and the injecting hole. The water container 2 is composed of a body 28 and a transparent cap 21, which are connected with each other via a seal ring 27. A heat-resisting rubber 29 is provided between the bottom of the container 2 and the water-injecting hole 30 in the upper board 1. A center valve lever 25 is fixed on and passed through the cap 21, wherein a knob 24 and a spring 22 are fixed on the upper portion and the central portion of the lever 25 respectively, and the lower portion of the lever 25 is opposite to the dripping hole 32. When the knob 24 rotates anticlockwise, the lever 25 is moved upward and from the dripping hole 32 so as to start water injection. Contrarily, when the knob 24 rotates clockwise, the lever 25 moves downward and its lower end is inserted into the dripping hole 32, so that the water cannot be injected. Moreover, the heat-resisting rubber 29 is also used for keeping the steam in the chamber.

It can also be seen that a water vessel 11 is arranged on said lower board 8 and just under the water-injecting hole 30. The lower board 8 has a oil slot 9 containing a plurality of oil holes 10. There is an oil vessel 7 under the base 6, and the oil in the oil slot 9 flows into the oil vessel 7 through the oil holes 10.

When food is being roasted, water drops into the chamber continuously and is evaporated due to the heat from the board, thus increasing the moisture and decreasing the loss of water inside the chamber. The continuous and timely replenishment of water can effectively prevent the roasted food from being over-dehydrated and guarantee the best quality of the roasted food. Moreover, the users can choose the amount and the time to add water at their own will.

With the help of the above detailed illustration, it is not difficult for those skilled in the art to find out this invention's following features and advantages:

1. The water-injecting device is fixed on the top cover in the upper part of the board, and it is very easy to disassemble the same for cleaning or observe the water level at any time through the transparent cap of the container.
2. A tiny hole is placed on the bottom of the container so that the gravitation will enable the water to drip into the chamber and evaporate in time.
3. The center-based water valve device makes it possible to start or stop the water dripping and control its speed at will.
4. A hole is placed in the center of the upper board to let water drip into the chamber and a water vessel is designed in the center of the bottom board to keep the water before it is evaporated. The rubber seal round the water-injecting hole of the upper board plays the function of keeping the steam inside the chamber.

What I claim is:

1. An oven comprising an oven body comprising a base and a top cover pivotally connected with the base;

a chamber comprising an upper heating plate fixed on the top cover an a lower heating plate fixed on the base; and a water injection mechanism positioned between the top cover and the upper heating plate.

2. The oven according to claim 1, wherein said water injection mechanism comprises a water container with a dripping hole on the bottom facing a water-injecting hole in the upper heating plate.

3. The oven according to claim 2, wherein said water container comprises a body and a transparent cap connected therewith via a seal ring, and a heat-resisting rubber is provided between the bottom of the container and the water-injecting hole.

4. The oven according to claim 3, wherein a center valve lever is fixed on and passed through the cap, wherein a knob and a spring are fixed at the upper portion and the central portion of the lever respectively, and the lower portion of the lever is opposite to the dripping hole.

5. The oven according to claim 1, wherein a vessel for storing water is arranged on said lower heating plate and directly under the water-injecting hole.

6. The oven according to claim 1, wherein said lower heating plate has a oil slot containing a plurality of oil holes, and a vessel for storing oil form the oil holes is arranged under the base.

7. The oven according to claim 1, wherein at least one electric-heating element is mounted on the reverse side of either heating plate.

* * * * *